United States Patent
Cheng

(12) 
(10) Patent No.: US 6,779,691 B2
(45) Date of Patent: Aug. 24, 2004

(54) AIRTIGHT BLADE VALVE DEVICE FOR EXHAUSTING DUST

(75) Inventor: Mao Nan Cheng, Taichung (TW)

(73) Assignee: San Ford Machinery Co., Ltd., Taichung (TW)

( * ) Notice: Subject to any disclaimer, the term of this patent is extended or adjusted under 35 U.S.C. 154(b) by 132 days.

(21) Appl. No.: 10/263,720

(22) Filed: Oct. 4, 2002

(65) Prior Publication Data

US 2004/0065857 A1 Apr. 8, 2004

(51) Int. Cl.⁷ .............................................. G01F 11/10
(52) U.S. Cl. ...................................................... 222/368
(58) Field of Search ..................... 251/129.11, 129.13, 251/305; 222/367, 368

(56) References Cited

U.S. PATENT DOCUMENTS 3,895,745 A * 7/1975 Hook .......................... 222/368
4,179,043 A * 12/1979 Fischer ....................... 222/368
5,002,084 A * 3/1991 Wilson ..................... 137/15.24
5,222,407 A * 6/1993 Sekiguchi ..................... 74/411

* cited by examiner

Primary Examiner—Edward K. Look
Assistant Examiner—John K. Fristoe, Jr.
(74) Attorney, Agent, or Firm—Troxell Law Office PLLC

(57) ABSTRACT

An airtight blade valve device for exhausting dust includes two faceplates, two side plates, plural threaded rods, a rotor and a speed-reducing motor. The two faceplates and the two side plates are assembled together by the threaded rods to make up a closed casing having an inlet and an outlet. The rotor is pivotally fitted between the two faceplates, consisting of a spindle and plural blades, and the spindle has a plurality of cut surfaces for the blades to be respectively secured thereon. Each blade has its peripheral edge respectively contact closely with the faceplate and the side plate to form closed spaces. At least one blade of the rotor will contact the arcuate portion of either of the two side plates when the rotor rotates to any position. Thus, the blades are rotated, exhausting out dust in an airtight condition.

5 Claims, 5 Drawing Sheets

AIRTIGHT BLADE VALVE DEVICE FOR EXHAUSTING DUST

BACKGROUND OF THE INVENTION

This invention relates to a valve device, particularly to one, which is airtight for exhausting dust.

A conventional dust collecting machine is to have a motor driving a windmill to suck dust and scraps into a dust collecting container by wind pressure and, after the dust collecting container is filled up with dust, the dust collecting machine will stop to have the dust in the dust collecting container cleaned up so as to avoid the dust floating about by wind pressure. However, the cleaning of collected dust cannot be done until the dust collecting machine stops operating, thus having to be interrupted temporarily as to influence work efficiency.

SUMMARY OF THE INVENTION

The objective of the invention is to offer an airtight blade valve device for exhausting dust, able to exhaust out dust continually by the rotating blades of the device when a dust-collecting machine keeps on operating and impossible to let dust float about.

Another objective of the invention is to offer an airtight blade valve device for exhausting dust, which includes a casing composed of two faceplates, two side plates and a plurality of threaded rods, economical in producing cost and easy in assembly.

The airtight blade valve device for exhausting dust in the present invention includes two faceplates respectively having a coaxial through hole in the center, an annular groove of the same size at the corresponding side and having the same axis as the through hole, and a plurality of insert holes bored in the outer edge of the round groove. The device further has two side plates positioned oppositely at the left and right side between the two faceplates, forming a closed casing having an inlet at the upper side and an outlet at the lower side. Each side plate has its intermediate arcuate portion protruding sidewise, with its left and right edge extending forward and making up an engage portion to engage the annular groove of the faceplate and having a horizontal flat wall respectively formed on the upper and the lower side. The device also has a plurality of threaded rods inserted through the insert holes of the faceplates for holding tightly the two side plates between the two faceplates, with the two side plates also limited in position by the horizontal flat walls. The device further has a rotor having it's opposite ends respectively fitted pivotally with the two through holes of the two faceplates, composed of a spindle and a plurality of blades. The spindle is a rod shape, having plural cut surfaces for the blades to be respectively secured thereon, with each blade having its peripheral edge respectively contacting closely with the faceplate and the side plate and forming airtight spaces, and at least one blade at the left and the right side of the rotor contacting the opposite arcuate portions of the two side plates, no matter what position the rotor rotates to. Lastly the device has a speed-reducing motor pivotally fitted with the spindle of the rotor for rotating the rotor.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
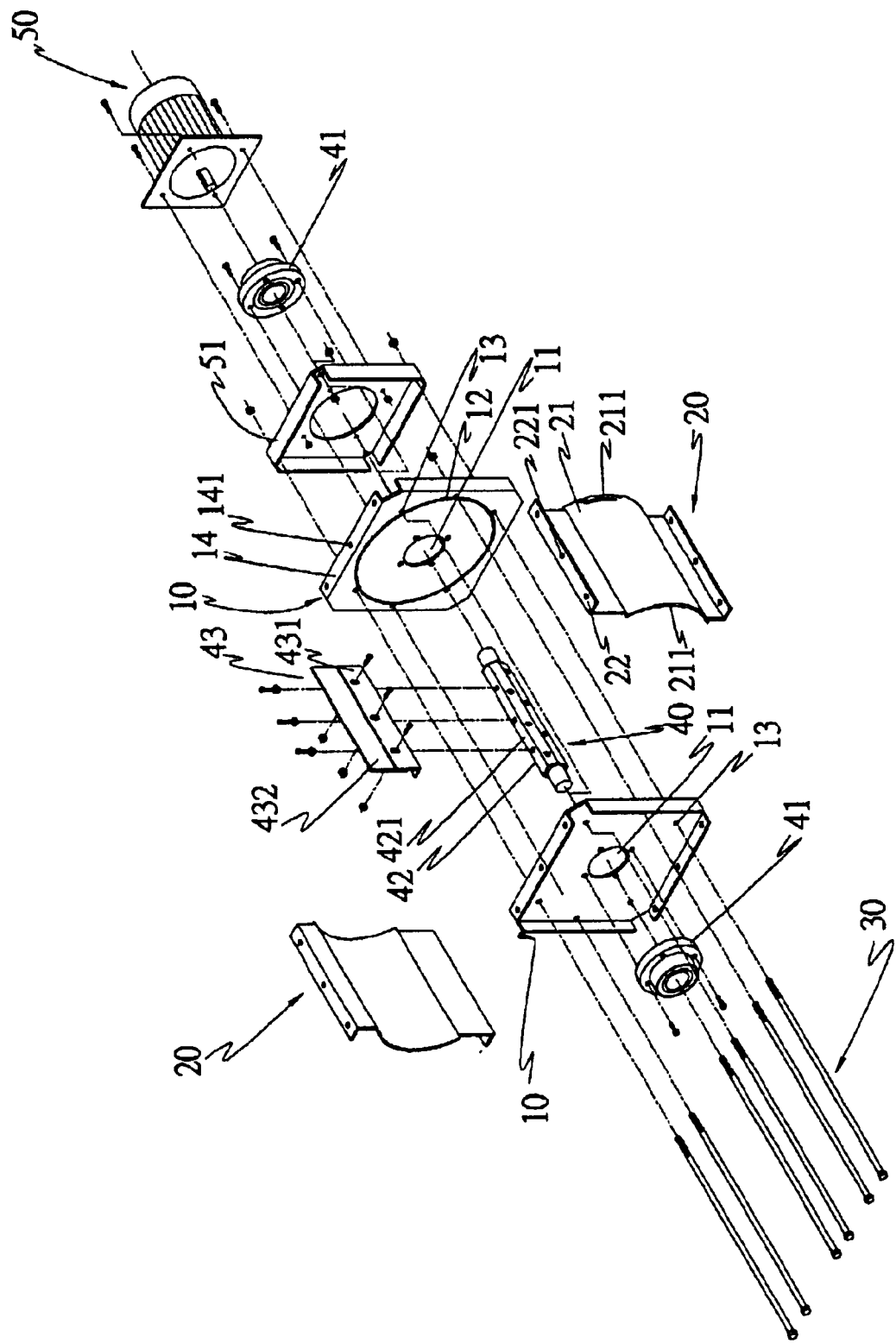
FIG. 1 is an exploded perspective view of an airtight blade valve device for exhausting dust in the present invention.
Figure 2:
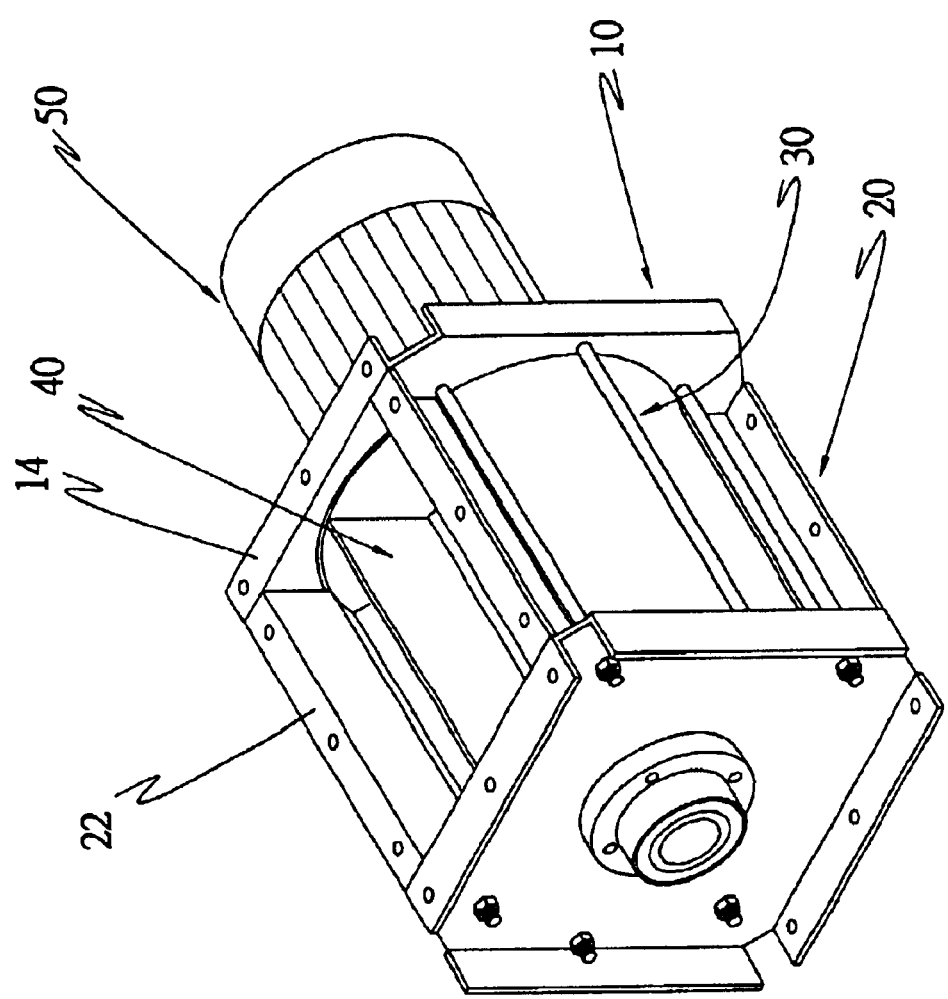
FIG. 2 is a perspective view of the airtight blade valve device for exhausting dust in the present invention.
Figure 3:
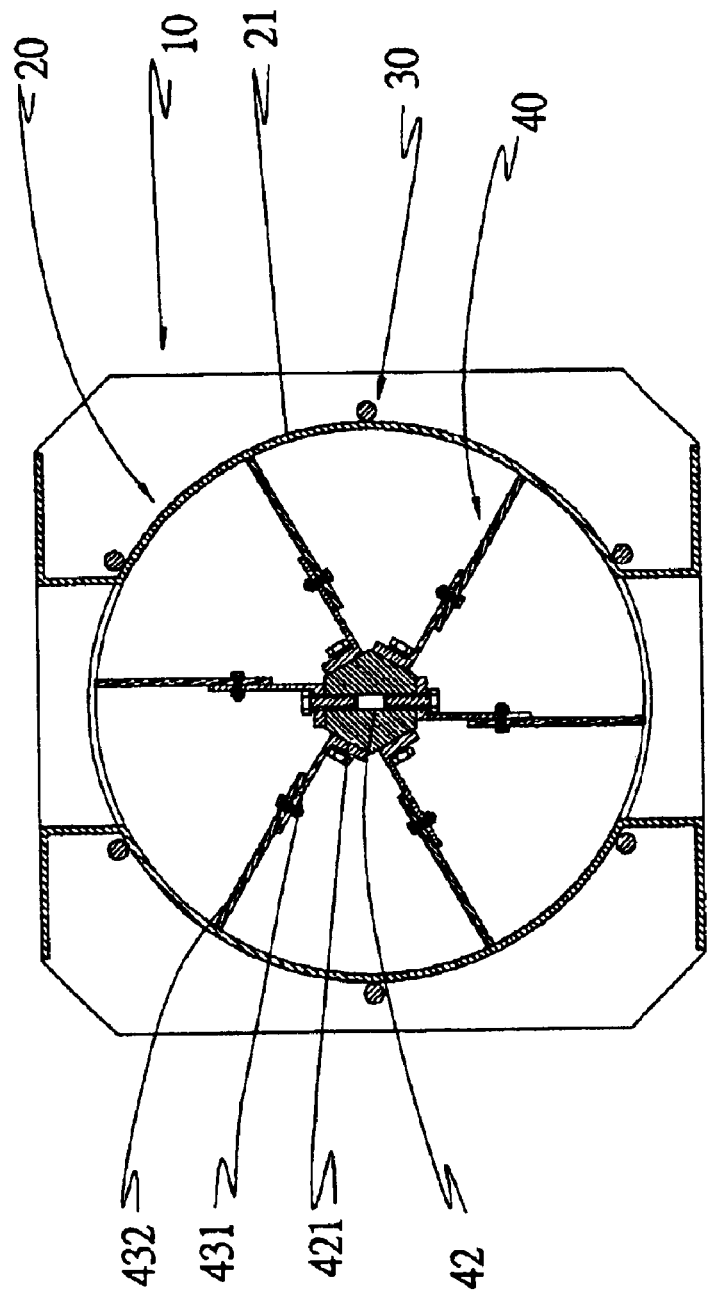
FIG. 3 is a cross-sectional view of the airtight blade valve device for exhausting dust in the present invention.

A preferred embodiment of an airtight blade valve device for exhausting dust in the present invention, as shown in FIGS. 1, 2 and 3, includes two faceplates 10, two side plates 20, a plurality of threaded rods 30, a rotor 40 and a speed-reducing motor 50 combined together.

The two faceplates 10 are square plates, respectively and oppositely located at the front and the rear side in parallel. Each faceplate 10 respectively have a coaxial through hole 11 in the center and a annular groove 12 bored at the corresponding side and having the same size as well as the same axis as the through hole 11. A plurality of insert hole 13 is bored at the left and the right side of the outer edge of each annular groove 12. Besides, each faceplate 10 has its upper and lower side respectively provided with a horizontal flat wall 14 protruding sidewise and having plural insert holes 141.

The two side plates 20 are shaped rectangular, positioned respectively at the left side and the right side oppositely between the two faceplates 10, with the upper and the lower sides of the two side plates 20 flush with those of the two faceplates 10. Thus, a closed casing is formed by assembling the two faceplates 10 with the two side plates 20 together, having an inlet defined by the upper sides of the faceplates 10 and the side plates 20 and an outlet at the lower side defined by the lower sides of the faceplates 10 and the side plates 20. Further, each side plate 20 has an intermediate arcuate portion 21 protruding sidewise, which has its left and right edge respectively extending forward and making up an engage portion 211 to engage the annular groove 12 of the faceplate 10 to position stably the side plates 20 between the two faceplates 10. In addition, each side plate 20 is provided with a horizontal flat wall 22 protruding sidewise respectively at the upper and the lower side and having a plurality of insert holes 221 spaced apart for combining other devices thereon in cooperation with the horizontal flat walls 14 of the faceplates 10.

The threaded rods 30 are respectively inserted through the insert holes 13 of the two faceplates 10 to tightly hold the two side plates 20 between the two faceplates 10.

The rotor 40 has its opposite ends respectively fitted pivotally in the two through holes 11 of the two faceplates 10 by means of two bearing bases 41. The rotor 40 is composed of a spindle 42 and a plurality of blades 43. The spindle 42 is, a polygonal rod having an even number of equidistant cut surfaces 421 for the blades 43 to be respectively secured thereon. In this preferred embodiment, the spindle 42 is a hexagonal rod and the rotor 40 has six blades 42. Each blade 43 consists of a L-shaped combining plate 431 and a soft airproof plate 432, and each L-shaped combining plate 431 has its horizontal bottom side firmly attached on each cut surface 421 of the spindle 42, while its upper edge secured with the airproof plate 432, which has its peripheral edge respectively contact closely with the faceplate 10 and the side plate 20, forming airtight spaces. Thus, there will be at least one blade 43 contacting closely with the opposite arcuate portions 21 of the two side plates 20, no matter what position the rotor 40 rotates to.

The speed-reducing motor 50 fixed with a base plate 51 is axially connected with the spindle 42 of the rotor 40 for rotating the rotor 40. The base plate 51 is fixedly assembled with the right faceplate 10 by the threaded rods 30.

In assembling, the speed-reducing motor 50 is fixed with the base plate 51 and then the blades 43 are respectively assembled on the cut surfaces 421 of the spindle 42. Next, the two bearing bases 41 are respectively secured on the two faceplates 10 and the rotor 40 has its opposite ends fitted pivotally with the two bearing bases 41 respectively. Then, the two side plates 20 have their engage portions 211 respectively engaged in the annular grooves 12 of the two faceplates 10, and the two faceplates 10 are assembled with the base plate 51 together by the threaded rods 30, which also tightly hold up the two side plates 20 in position. Lastly, the base plate 51 is secured on the right faceplate 10 and the spindle of the speed-reducing motor 50 is connected with one end of the rotor 40 for rotating together directly.

Figure 4:
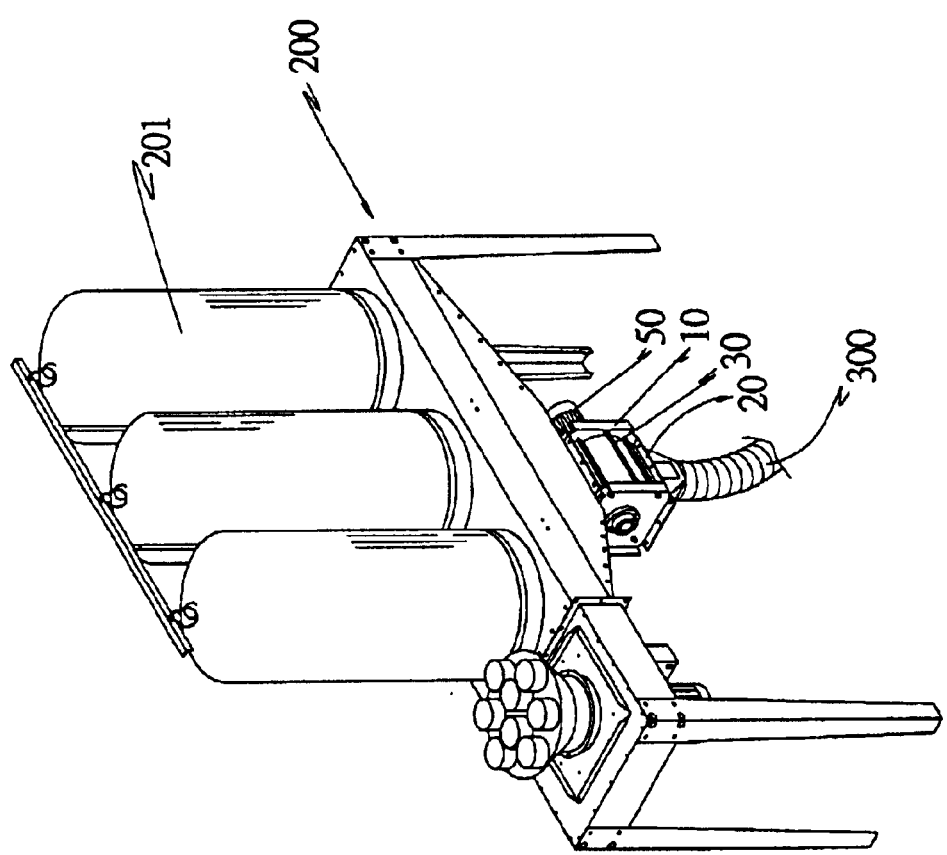
FIG. 4 is a perspective view of the airtight blade valve device assembled with a dust-collecting machine in the present invention.
Figure 5:
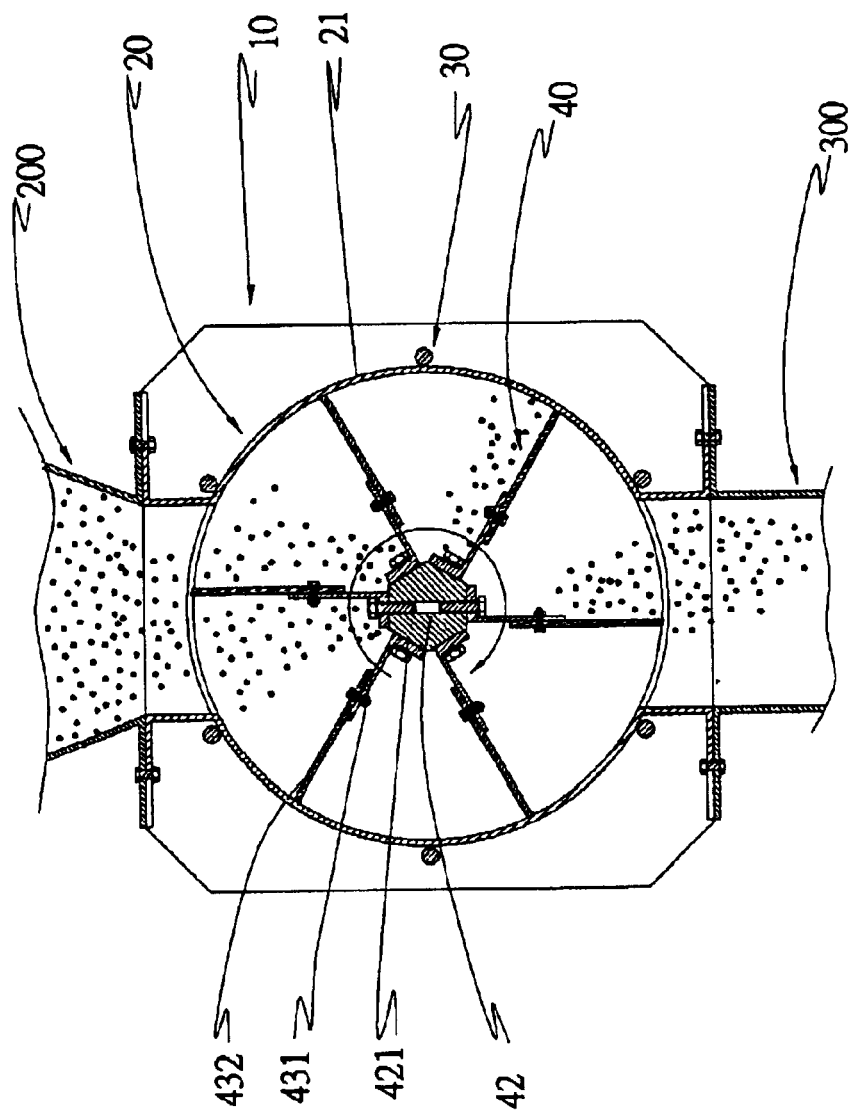
FIG. 5 is a cross-sectional view of the airtight blade valve device assembled with the dust-collecting machine in an operating condition in the present invention.

In using, as shown in FIG. 4, a dust-collecting machine 200 can be assembled on the faceplates 10 and the side plates 20 of the casing of this invention and has the opening of its dust-collecting container 201 communicate with the inlet of the casing, with the outlet of the casing connected with a dust-gathering device 300. As shown in FIG. 7, when the dust-collecting machine 200 operates, collected dust or scraps will drop into the space between every two abutting blades 43 above the rotor 40 through the opening of the dust-collecting container 201. At this time, the speed-reducing motor 50 will rotate together with the rotor 40 and the blades 43 as well as the dust, and then the dust will drop down into the dust-gathering device 300 through the outlet of the casing when the edge of the blade 43 separates from the arcuate portion 21 of the side plate 20 and shifts to the lower side of the rotor 40.

As the peripheral edge of each blade 43 respectively contact closely with the inner surfaces of the two faceplates 10 and of either of the two side plates 20 to form an airtight space and at any time the rotor 40 has at least one blade 43 respectively contact the arcuate portion 21 of either of the two side plates 20, therefore the inlet and the outlet of the casing are always isolated from each other, no matter what position the rotor 40 rotates to and whether the rotor 40 rotates or not. Under this condition, the dust in the dust-collecting container 201 is impossible to float about by releasing of the wind pressure in the dust collecting container 201 and can continually be exhausted out to be gathered together and cleaned even during when the dust collecting machine 200 is still operating, increasing work efficiency, avoiding dust floating about and maintaining a clean working environment.

In addition, the faceplates 10 and side plates 20 in this invention are made of metal plates through compression and cutting and fixedly assembled together by the threaded rods 30, low in producing cost and able to be assembled quickly and easily.

While the preferred embodiment of the invention has been described above, it will be recognized and understood that various modifications may be made therein and the appended claims are intended to cover all such modifications that may fall within the spirit and scope of the invention.

I claim:

1. An airtight blade valve device for exhausting dust comprising:

two faceplates located respectively at a front and a rear side in parallel, said two faceplates respectively having a coaxial through hole in the center, said two faceplates respectively bored with a round groove at the corresponding side, said two annular grooves having a same size and a same axis as said through hole, each said faceplate provided with a plurality of insert holes at the left and the right side of the outer edge of said annular groove;

two side plates positioned respectively and oppositely at a left side and a right side between said two faceplates, said two faceplates and said two side plates assembled together to make up a closed casing, said casing having an inlet at the upper side and an outlet at the lower side, each said side plate having an intermediate arcuate portion protruding outward, each said arcuate portion having its left and right edge respectively extending forward and making up an engage portion, said engage portions respectively engaged said two annular grooves of said two faceplates;

a plurality of threaded rods respectively inserted through said insert holes of said two faceplates, said threaded rods positioning said two side plates between said two faceplates, said threaded rods firmly holding said two side plates in position;

a rotor having its opposite ends respectively fitted pivotally in said two through holes of said two faceplates, said rotor consisting of a spindle and a plurality of blades, said spindle being a polygonal rod having plural cut surfaces, said cut surfaces formed axially and equidistantly for said blades to be respectively secured thereon, each said blade having its peripheral edge contacting closely with inner surfaces of said two faceplates and either of said two side plates so that all of said blades form the same number of airtight spaces, said rotor having at least one of said, blades respectively contacting either of said two arcuate portions of said two side plates; and a speed-reducing motor axially connected with said spindle of said rotor, said speed-reducing motor rotating said rotor.

2. The airtight blade valve device for exhausting dust as claimed in claim 1, wherein the upper and the lower side of said two side plates are flush with those of said two faceplates, and said upper and said lower side of said two side plates and said two faceplates are respectively provided with a horizontal flat wall protruding sidewise for other devices to be assembled thereon.

3. The airtight blade valve device for exhausting dust as claimed in claim 1, wherein each said blade of said rotor is composed of an L-shaped combining plate and an airproofing plate, and said L-shaped combining plate has its horizontal bottom side secured on one of said cut surfaces on said spindle and its upper edge combined with said airproof plate.

4. The airtight blade valve device for exhausting dust as claimed in claim 1, wherein said speed-reducing motor is fixed on a base plate which is secured on one of said two faceplates by said threaded rods.

5. The airtight blade valve device for exhausting dust as claimed in claim 1, wherein said spindle of said rotor is formed with six of said cut surfaces and said rotor is provided with six of said blades.

* * * * *